United States Patent [19]

Hara et al.

[11] Patent Number: 5,281,376
[45] Date of Patent: Jan. 25, 1994

[54] METHOD FOR PRODUCING POLYPROPYLENE RESIN ARTICLE HAVING SKIN MATERIAL LINED WITH FOAMED LAYER

[75] Inventors: Takahisa Hara, Kawanishi; Masahito Matsumoto, Ibaraki; Nobuhiro Usui, Takatsuki; Shigeyoshi Matubara, Osaka, all of Japan

[73] Assignee: Sumitomo Chemical Company, Limited, Osaka, Japan

[21] Appl. No.: 775,107

[22] Filed: Oct. 11, 1991

[30] Foreign Application Priority Data

Oct. 12, 1990 [JP] Japan ................... 2-274457

[51] Int. Cl.⁵ .............................. B29C 67/22
[52] U.S. Cl. ......................... 264/46.4; 264/54; 264/328.7
[58] Field of Search ........... 264/46.4, 46.6, 46.8, 264/54, 328.7

[56] References Cited

U.S. PATENT DOCUMENTS

| | | | |
|---|---|---|---|
| 3,793,415 | 2/1974 | Smith | 264/328.7 |
| 4,035,458 | 7/1977 | Lyman | 264/46.4 |
| 4,783,292 | 11/1988 | Rogers | 264/40.6 |
| 4,976,414 | 12/1990 | Yanagishita | 264/40.3 |
| 5,034,076 | 7/1991 | Masui et al. | 264/273 |
| 5,116,556 | 5/1992 | Danton | 264/46.4 |

FOREIGN PATENT DOCUMENTS

| | | | |
|---|---|---|---|
| 0192218 | 8/1986 | European Pat. Off. | 264/46.4 |
| 0242191 | 10/1987 | European Pat. Off. | |
| 2622503 | 5/1989 | France | |
| 55-156037 | 12/1980 | Japan | 264/46.4 |
| 58-029633 | 2/1983 | Japan | 264/46.6 |
| 62-214938 | 9/1987 | Japan | 264/46.4 |
| 2-103108 | 4/1990 | Japan | |
| 2-160692 | 4/1990 | Japan | |
| 1452101 | 10/1976 | United Kingdom | 264/46.4 |

Primary Examiner—Allan R. Kuhns
Attorney, Agent, or Firm—Birch, Stewart, Kolasch & Birch

[57] ABSTRACT

A multi-layer molded article which is made of a polypropylene resin body and a skin material lined with a foamed layer and has good appearance is produced by using molds between which a cavity clearance is freely set, placing a skin material lined with a foamed layer between the upper and lower molds and supplying a molten polypropylene resin containing a chemical blowing agent through a resin melt conduit in the lower mold when cavity clearance (t) is between (C+15) mm and (C+50) mm where "C" is a thickness of the skin material lined with the foamed layer, lowering the upper mold at a specific rate and pressing the molten resin at specific pressure to fill cavity ends with the molten resin to complete molding of a body of the resin, pressing the body for a certain time after completing molding to form a skin layer, lifting up the upper mold to decrease a compression pressure of the skin material lined with the foamed layer to a pressure lower than a blowing pressure of the polypropylene resin to form and solidify a foamed body, and again lowering the upper mold to apply a certain pressure on a molded article and cooling the article in the molds.

14 Claims, 3 Drawing Sheets

METHOD FOR PRODUCING POLYPROPYLENE RESIN ARTICLE HAVING SKIN MATERIAL LINED WITH FOAMED LAYER

BACKGROUND OF THE INVENTION

1. Field of the Invention

The present invention relates to a method for producing a polypropylene resin article having a laminated skin material which is lined with a foamed layer.

2. Description of the Related Art

Because of low cost, light weight, good decoration effects and feeling, a multi-layer molded article comprising a polypropylene resin body and a skin material which is laminated thereon is widely used in various industrial fields including automobile and appliance industries.

Recently, demand for light weight parts increases in particular in the automobile industry. Therefore, it is highly desired to produce a multi-layer molded article comprising the polypropylene resin body and the skin material which has good feeling and also has a body resin with a light weight.

When a skin material which is lined with a foamed layer is used, by the conventional molding method, the foamed layer tends to be partly damaged by pressure and heat during supply of the resin melt or the multi-layer molded article tends to have uneven surfaces, if the foamed layer has a large expansion ratio or low heat and pressure resistance.

SUMMARY OF THE PRESENT INVENTION

An object of the present invention is to provide a novel method for producing a multi-layer molded article comprising a polypropylene resin body and a skin material lined with a foamed layer.

According to the present invention, there is provided a method for producing a multi-layer molded article comprising a polypropylene resin body and a skin material lined with a foamed layer, which method comprises steps of:

providing a pair of upper and lower molds (1,2) which are slidably moved at engaged part (6) and in which cavity clearance (t) is freely set, placing skin material (7) lined with a foamed layer between said upper and lower molds and supplying a molten polypropylene resin which is blown by a chemical blowing agent through a resin melt conduit which is provided in said lower mold or said upper mold when said cavity clearance (t) is between (C+15) mm and (C+50) mm where "C" is a thickness of said skin material lined with the foamed layer, lowering said upper mold (1) at a rate of from 10 mm/sec. to 100 mm/sec. and pressing said molten resin at pressure of from 5 kg/cm² to 100 kg/cm² to fill cavity ends with said molten resin, pressing said body for 1 to 30 seconds after completing molding to form a skin layer, then, lifting up said upper mold 1 to decrease a compression pressure of said skin material lined with the foamed layer to a pressure lower than a blowing pressure of said blowing agent contained in said polypropylene resin to form and solidify a foamed body, and again lowering said upper mold (1) to apply a pressure of from 1 kg/cm² to 20 kg/cm² on a molded article and cooling said article in said molds.

DETAILED DESCRIPTION OF THE DRAWINGS

Now, the present invention will be explained by making reference to the accompanying drawings.

FIGS. 2 to 5 show cross sections of a mold to be used in the method of the present invention, which comprises upper mold 1 which is vertically moved and lower mold 2 which is fixed. Lower mold 2 has resin melt conduit 3 therein, one end 4 of which is connected to a resin supplier (not shown).

Figure 2:
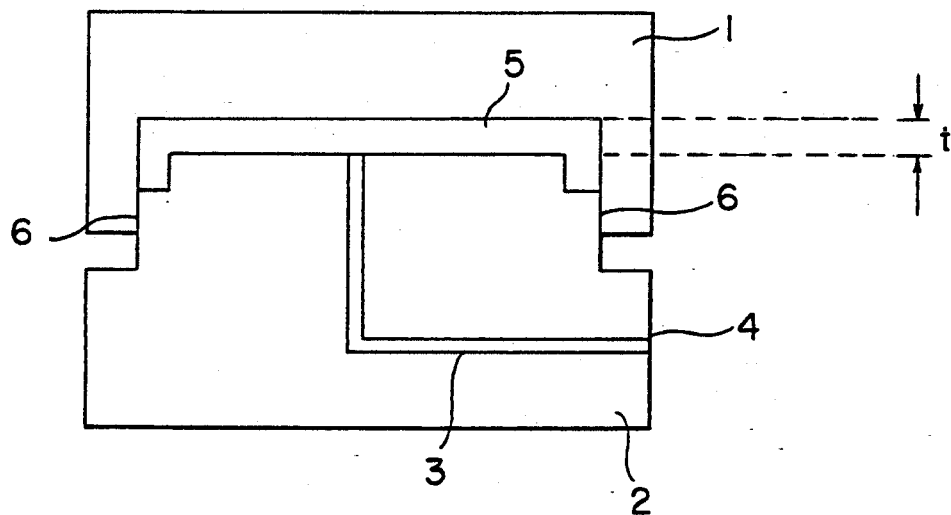
FIGS. 2 to 5 are cross sections of a pair of upper and lower molds in various steps of the method of the present invention.
Figure 3:
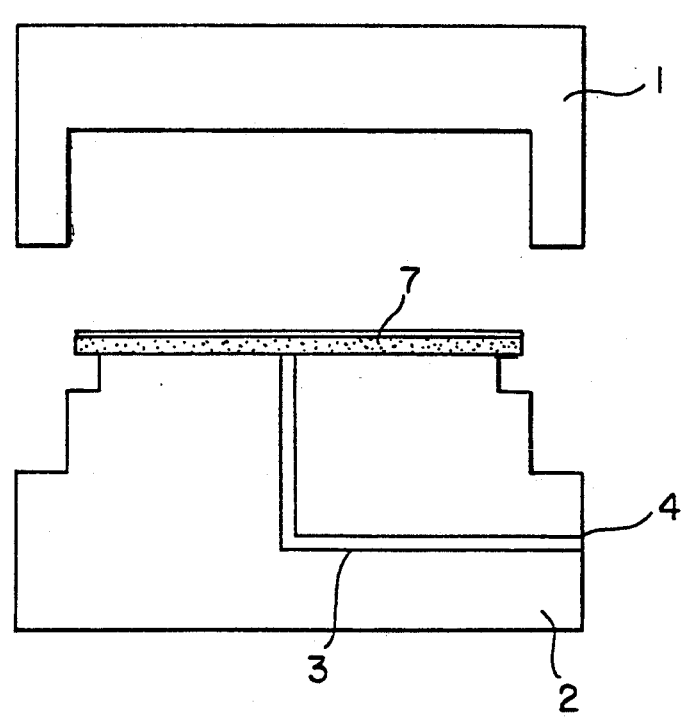

FIG. 2 shows the upper and lower molds 1,2 when they are closed to form cavity 5. The molds are slidably engaged at part 6 and a distance between the upper and lower molds at engaging part 6 is so small that the resin melt is not squeezed out through this part. Cavity clearance (t) can be freely set by vertically moving upper mold 1.

In the FIGS. numeral 7 stands for a skin material lined with a foamed layer.

Figure 1:
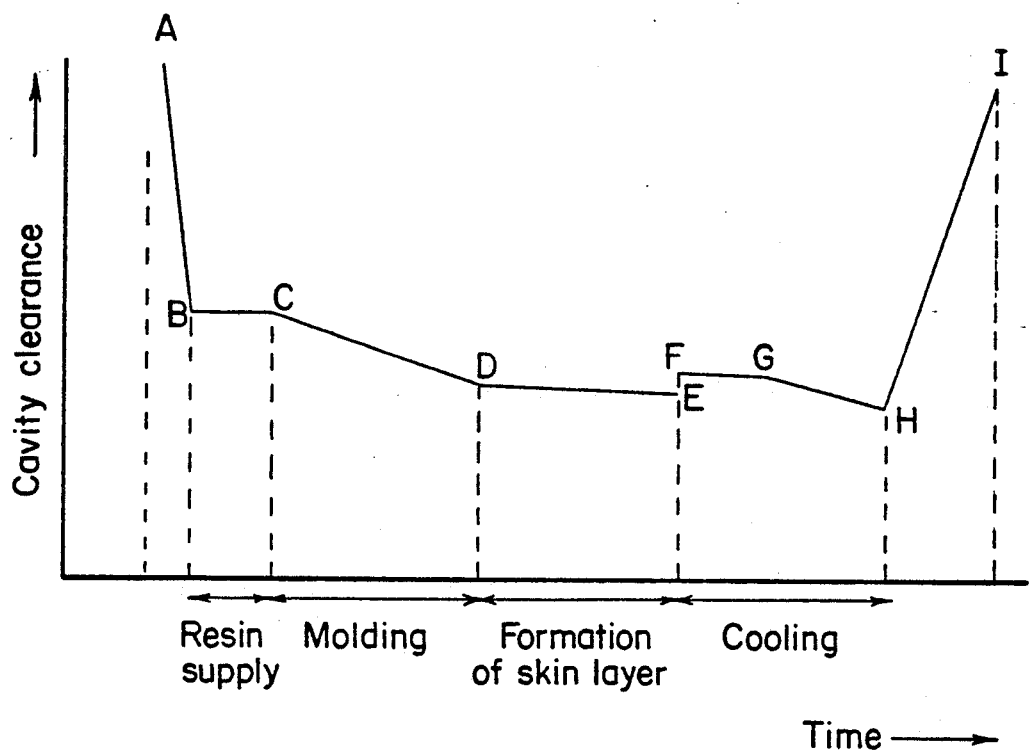
FIG. 1 illustrates the change of cavity clearance (t) in the molding steps according to the present invention.

FIG. 1 illustrates molding steps of one embodiment of the method of the present invention, in which, a vertical axis represents cavity clearance (t) and the horizontal axis represents a time during the molding.

One embodiment of the method of the present invention will be explained by making reference to FIG. 1.

First, skin material 7 lined with the foamed layer is placed on lower mold 6, and upper mold 1 is lowered from point A to point B in FIG. 1. At point B, clearance (t) is between (C+15) mm and (C+50) mm where "C" is a total thickness of the skin material including the foamed layer. Then, a polypropylene resin melt containing a chemical blowing agent which resin forms an article body is supplied through resin melt conduit 3 into cavity 5 (between points B and C in FIG. 1).

Insofar as clearance (t) is in the above range, the polypropylene resin melt can be supplied while the upper mold is stopped or lowered.

Figure 4:
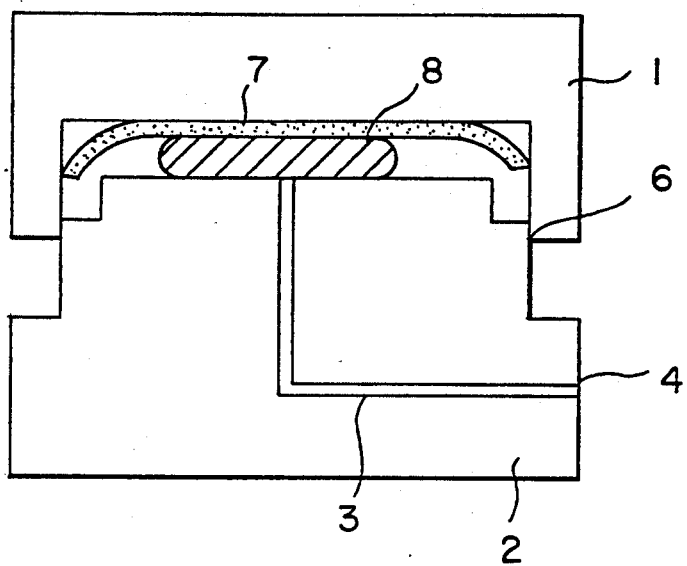

FIG. 4 shows the cross section of the molds when the supply of the resin melt is completed (point C in FIG. 1).

Since the cavity clearance is selected in the above range, the foamed layer which lines the skin material is not damaged by the pressure and heat.

Second, the upper mold 1 is lowered at a rate of 10 to 100 mm/sec., and the resin melt is pressurized at pressure of from 5 kg/cm² to 100 kg/cm² to fill cavity ends with the molten resin to complete molding of a body of the resin (between points C and D in FIG. 1).

Since the polypropylene resin melt is molded under the above conditions, the skin material and the foamed layer are not damaged, the resin melt is flowed to the cavity ends and molded, and further the blowing of the resin melt is suppressed.

Third, the resin is pressed for 1 to 30 seconds after completing of resin molding to form a skin layer (between points D and E in FIG. 1). A time between points D and E is selected so that a part of the resin melt which contacts the mold is cooled and solidified while a center part of the resin melt mass is not solidified and can be blown. An actual time vary with a thickness of the molded article and an expansion ratio.

Then, the upper mold 1 is lifted up (between the points E and F) to decrease a compression pressure of the skin material lined with the foamed layer to a pressure lower than a blowing pressure of said blowing agent contained in the polypropylene resin to blow the core part of the resin melt mass, whereby an article body is formed and solidified (between points F and G in FIG. 1).

Figure 5:
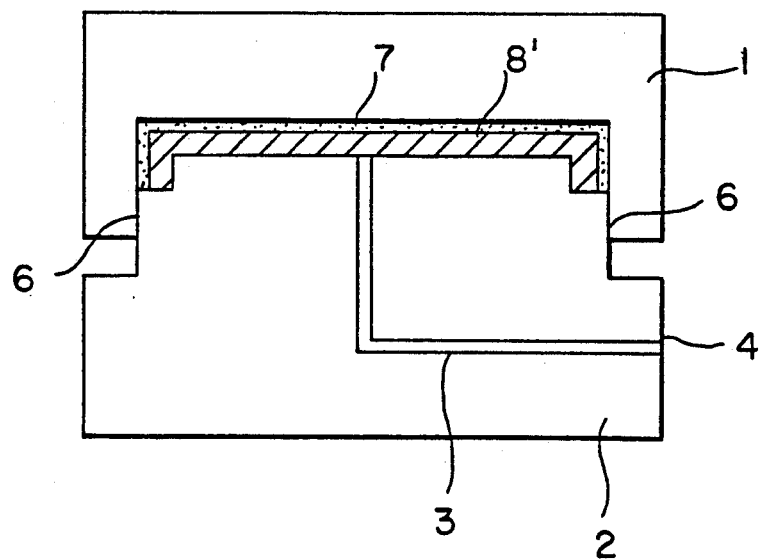

Upper mold (1) is again lowered to apply a pressure of from 1 kg/cm$^2$ to 20 kg/cm$^2$ on the molded article and the article is cooled in the molds to complete the production of the multi-layer molded article (between points G and H in FIG. 1). FIG. 5 shows the molds at point H.

Figure 6:
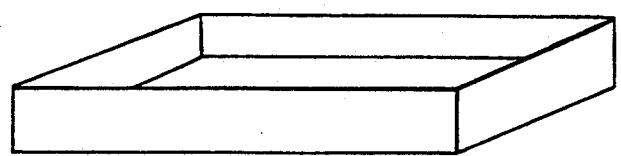
FIG. 6 is a box-shape article produced by the method of the present invention.

Finally, the molds are opened (between points H and I in FIG. 1) to recover the molded article having the foamed resin body and the skin material which is laminated on the resin body as shown in FIG. 6.

Since the molded article according to the present invention has, on a surface, the skin material lined with the foamed layer which are not damaged and the skin material has the lined foamed layer, the article has a soft feeling and good appearance. In addition, a surface having no skin material has an unfoamed smooth skin layer with gloss. Therefore, the both surfaces of the molded article have good appearance. Since the resin body is foamed, the whole article is light.

Preferred examples of the skin material are a sheet or leather of polyvinyl chloride, a leather or sheet of a thermoplastic elastomer, woven or non-woven fabrics and the like. Preferred examples of the foamed layer for lining are a foamed sheet of crosslinked polypropylene, a polyurethane foamed sheet and the like. The skin material and the foamed sheet are bonded with an adhesive or by extrusion lamination.

The polypropylene resin includes not only a homopolymer of propylene but also a copolymer of propylene with at least one other comonomer such as ethylene and the like. Further, the polypropylene resin may contain other resin such as polyethylene or a thermoplastic elastomer, or a filler such as calcium carbonate or talc. However, the content of the polypropylene resin should be at least 50% by weight in a composition.

As the chemical blowing agent to be used in the method of the present invention, any of chemical blowing agents which are conventionally used to blow the polypropylene resin may be used. Examples of the chemical blowing agent are inorganic blowing agents (e.g. sodium bicarbonate) and organic blowing agents (e.g. azodicarbonamide).

PREFERRED EMBODIMENTS OF THE INVENTION

The present invention will be illustrated by following Examples.

EXAMPLE 1

As a molding resin, polypropylene (Sumitomo Noblen (trademark) BPZ 5077 manufactured by Sumitomo Chemical Co., Ltd.) containing 3% by weight of an inorganic blowing agent (Cellmike MB 3062 manufactured by Sankyo Chemical Co., Ltd.) was used. As a skin material lined with a foamed layer, a laminate sheet made of a polyvinyl chloride sheet having a thickness of 0.6 mm lined with a polypropylene foam sheet having a thickness of 3.0 mm (an expansion rate of 15) was used (a total thickness of 3.6 mm).

The mold had a cavity for molding a box-shape article of FIG. 6 having a length of 300 mm, a width of 250 mm and a height of 70 mm. The article was molded in the following steps.

First Step

The skin material lined with the foamed layer was placed between the upper mold kept at 30° C. and the lower mold kept at 80° C., and the upper mold was lowered to cavity clearance (t) of 30 mm. Then, a polypropylene resin melt heated at 190° C. was supplied through the resin melt conduit in the lower mold (between points B and C in FIG. 1).

Second Step

As soon as the resin melt supply was finished, upper mold 1 was lowered at a rate of 20 mm/sec. to press the resin melt under pressure of 60 kg/cm$^2$ for 2 seconds to the mold (between points C and D in FIG. 1).

Third Step

The resin melt was further pressed under pressure of 60 kg/cm$^2$ for 5 seconds to form a skin layer (between points D and E in FIG. 1).

Fourth Step

Upper mold 1 was lifted up by 3.0 mm (between points E and F in FIG. 1) to blow and solidify a core (body) part for 30 seconds (between points F and G in FIG. 1). Thereafter, the molded article was kept cooled under pressure of 10 kg/cm$^2$ for 30 seconds (between points G and H in FIG. 1).

The molded article had an expension ratio of 1.2 and consisted of the body part having a thickness of 2 mm and the skin material lined with the foamed layer having a thickness of 3 mm. The molded article had a very good appearance on both surfaces.

COMPARATIVE EXAMPLE 1

In the same manner as in Example 1 except that the polypropylene resin contained no blowing agent, a multi-layer molded article was produced. The article was not foamed and in addition the surfaces were uneven.

EXAMPLE 2

As a molding resin, polypropylene (Sumitomo Noblen (trademark) AX 568, MFR 65 manufactured by Sumitomo Chemical Co., Ltd.) containing 2% by weight of an azodicarbonamide blowing agent (Cellmike MB 3013 manufactured by Sankyo Chemical Co., Ltd.) was used. The same molds as used in Example 1 were used. As a skin material lined with a foamed layer, a laminate sheet made of a tricot (woven fabric) having a thickness of 2 mm to which a polyurethane foam sheet having a thickness of 10 mm (an expansion rate of 16) was adhered was used.

The article was molded by the following steps.

First Step

The skin material lined with the foamed layer was placed between the upper mold kept at 30° C. and the lower mold kept at 50° C., and the upper mold was lowered to cavity clearance (t) of 45 mm. Then, a polypropylene resin melt heated at 200° C. was supplied through the resin melt conduit in the lower mold (between points B and C in FIG. 1).

Second Step

As soon as the resin melt supply was finished, upper mold 1 was lowered at a rate of 20 mm/sec. to press the resin melt under pressure of 30 kg/cm² for 2 seconds of the mold (between points C and D in FIG. 1).

Third Step

The resin melt was further pressed under pressure of 30 kg/cm² for 5 seconds to form a skin layer (between points D and E in FIG. 1).

Fourth Step

Upper mold 1 was lifted up by 12.0 mm (between points E and F in FIG. 1) to blow and solidify a core (body) part of 30 seconds (between points F and G in FIG. 1). Thereafter, the molded article was kept cooled under pressure of 15 kg/cm² for 40 seconds (between points G and H in FIG. 1).

The molded article had an expansion ratio of 1.3 and a thickness of 3 mm at a bottom part of the box, and was laminated with the skin material lined with the foamed layer having a thickness of 10 mm. The molded article had a very good appearance on both surfaces as in Example 1.

COMPARATIVE EXAMPLE 2

In the same manner as in Example 2 except that the polypropylene resin contained no blowing agent, a multi-layer molded article was produced. The total thickness of the skin material was decreased to 8 mm. In addition, a part of the foamed layer near an opening of the resin melt conduit was broken by the pressure and heat of the polypropylene resin melt for the article body.

The above conditions and the results are summarized in the following Table.

TABLE

| Example No. | Body resin | Skin material | Blowing agent (amount) | Resin temp. (°C.) | Mold temp. (°C.) upper/lower | First step Clearance at resin melt supply (mm) | Second step Mold lowering rate (mm/sec) | Second step Pressure (kg/cm²) | Second step Time (sec) |
|---|---|---|---|---|---|---|---|---|---|
| 1 | BPZ 5077 | PVC sheet 0.6 mmt PP foamed sheet (expansion rate of 15) 3 mmt | Cellmike MB 3062 (3 wt. %) | 190 | 30/80 | 30 | 20 | 60 | 2 |
| C. 1 | ↑ | ↑ | None | ↑ | ↑ | ↑ | ↑ | ↑ | ↑ |
| 2 | AX 568 | Tricot 2 mmt Polyurethane foamed sheet (expansion rate of 16) 10 mmt | Cellmike MB 3013 (2 wt. %) | 200 | 30/50 | 45 | 20 | 30 | 2 |
| C. 2 | ↑ | ↑ | None | ↑ | ↑ | ↑ | ↑ | ↑ | ↑ |

| Example No. | Third step Skin formation Pressure (kg/cm²) | Time (sec) | Fourth step Mold lifting distance (mm) | Fourth step Mold lifting time (sec) | Fourth step Pressure (kg/cm²) | Fourth step Time (sec) | Appearance of molded article |
|---|---|---|---|---|---|---|---|
| 1 | 60 | 5 | 3.0 | 30 | 10 | 30 | Skin material side: good<br>Body resin side: smooth and gloss, good |
| C. 2 | ↑ | ↑ | ↑ | ↑ | ↑ | ↑ | No foaming of body resin<br>Skin material side: unevenness |
| 2 | 30 | 5 | 12 | 30 | 15 | 40 | Skin material side: good<br>Body resin side: smooth and gloss, good |
| C. 3 | ↑ | ↑ | ↑ | ↑ | ↑ | ↑ | No foaming, skin material being thinned,<br>Foamed layer near the conduit opening being broken |

What is claimed is:

1. A method for producing a multi-layer molded article comprising a polypropylene resin body and a skin material lined with a foamed layer, which method comprises the steps of:

provic a pair of upper and lower molds (1,2) which are slidably moved at an engaged part (6) and in which a cavity clearance (t) is freely set, placing a skin material (7) lined with a foamed layer between said upper and lower molds and supplying a molten polypropylene resin containing a chemical blowing agent through a resin melt conduit which is provided in said lower mold (2) or said upper mold (1) when said cavity clearance (t) is between (C+15) mm and (C+50) mm where "C" is a thickness of said skin material lined with the foamed layer, lowering said upper mold (1) at a rate of from 10 mm/sec. to 100 mm/sec. and pressing said resin melt at pressure of from 5 kg/cm² to 100 kg/cm² to fill cavity ends with said resin melt, pressing said body for 1 to 30 seconds after completing molding to form a skin layer, then, lifting up said upper mold (1) to decrease a compression pressure of said material lined with the foamed layer to a pressure lower than a blowing pressure of said blowing agent contained in said polypropylene resin to form and solidify a foamed body, and again lowering said upper mold (1) to apply a pressure of from 1 kg/cm² to 20 kg/cm² on a molded article and cooling said article in said molds.

2. The method according to claim 1, wherein said propylene resin is a homopolymer of propylene.

3. The method according to claim 1, wherein said propylene resin is a copolymer of propylene with at least one other monomer.

4. The method according to claim 1, wherein the chemical blowing agent is sodium bicarbonate or azodecarbonamide.

5. The method according to claim 1, wherein said skin material is a sheet or leather of polyvinyl chloride, a sheet or leather of a thermoplastic elastomer, or a woven or non-woven fabric.

6. The method according to claim 1, wherein the foamed layer is a foamed sheet of a crosslinked polypropylene or a foamed sheet of a polyurethane.

7. The method according to claim 1, wherein the skin material and the foamed sheet are bonded with an adhesive.

8. The method according to claim 1, wherein the skin material and the foamed sheet are bonded by extrusion lamination.

9. The method according to claim 3, wherein said at least one other monomer is ethylene.

10. The method according to claim 1, wherein said polypropylene resin contains polyethylene.

11. The method according to claim 1, wherein said polypropylene resin contains a thermoplastic elastomer.

12. The method according to claim 1, wherein said polypropylene resin contains a filler.

13. The method according to claim 12, wherein the filler is calcium or talc.

14. The method according to claim 1, wherein the content of the polypropylene resin body is at least 50% by weight.

* * * * *